Patented Nov. 8, 1938

2,135,816

UNITED STATES PATENT OFFICE 2,135,816

METHOD FOR THE PRODUCTION OF THE CONTOURS IN THE DRAWING TO BE TRANSFERRED BY HELIOGRAVURE UPON THE INTAGLIO CYLINDERS OR PLATES

Karl Hintsches, Oberkotzau, Germany

No Drawing. Application April 1, 1936, Serial No. 72,054. In Germany August 3, 1935

1 Claim. (Cl. 95—5)

For the printing on oil-cloth, leather-cloth, wall-paper and similar articles intaglio cylinders or plates are commonly employed on which the drawing or copy is applied after the manner of heliogravure. Walls alternating with depressions are produced on the printing surface, the depressions designed to take up the printing ink which they give up subsequently to the cloth during the printing.

Hatchings are produced on the printing surface of the printing cylinders or plates which subdivide the printing surface into a number of part-surfaces.

Experience has shown that the edges of these part surfaces are not smooth at the ink-delivery onto the cloth. To avoid this defect, contours are drawn around the hatched portions. This drawing of contours is complicated and wastes time. These contours are produced during the photographing and milling by drawing or engraving. In the heliogravure the contours have been produced by drawing upon scraping paper and subsequent scraping out, on which followed the exposure. In another method the contours are drawn on to the photograph made on photographing paper and the hatchings were printed in.

The invention provides a simplified method. The essence of the invention consists in that the hatchings are copied on to the plates or exposed films and the contours around the hatched portions are scratched by means of a scratching pen, graving tool or the like under the magnifying glass into a negative made from the photography.

By this method a uniform thickness is obtained and the contour is finer than the hatching. The contours can be made more rapidly. The resulting advantages represent a serious progress in comparison with the method employed up to the present.

I claim:—

A method of preparing intaglio cylinders or plates for printing on materials having a rough and porous surface, comprising preparing a positive photographic image of the pattern to be printed by the cylinder or plate, copying hatching into the positive image, preparing a negative from the positive image, and scribing the contour of the hatched areas by means of a sharp pointed instrument with the aid of a magnifying glass.

KARL HINTSCHES.